United States Patent
Vernacchia et al.

(10) Patent No.: US 7,752,935 B2
(45) Date of Patent: Jul. 13, 2010

(54) CONTROL SYSTEM FOR A MULTI-SPEED TRANSMISSION

(75) Inventors: Mark A. Vernacchia, Northville, MI (US); Brian W. Whitmarsh, Commerce, MI (US); Joshua E. Lehrmann, Ann Arbor, MI (US); Todd W. Rooney, Howell, MI (US); Wayne B. Vogel, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 337 days.

(21) Appl. No.: 12/029,787

(22) Filed: Feb. 12, 2008

(65) Prior Publication Data

US 2008/0216908 A1    Sep. 11, 2008

Related U.S. Application Data

(60) Provisional application No. 60/893,882, filed on Mar. 8, 2007.

(51) Int. Cl.
*F16H 59/00* (2006.01)
(52) U.S. Cl. ........................................................ 74/335
(58) Field of Classification Search .................. 74/331, 74/335; 475/116
See application file for complete search history.

(56) References Cited

U.S. PATENT DOCUMENTS 6,637,282 B2 * 10/2003 Harries ........................ 74/335

* cited by examiner

*Primary Examiner*—Dirk Wright

(57) ABSTRACT

A hydraulic control circuit for a transmission includes a plurality of solenoids and valves in fluid communication with a plurality of actuators. The actuators are operable to actuate a plurality of torque transmitting devices. Selective activation of the solenoids allows for a pressurized fluid flow to activate at least one of the actuators in order to shift the transmission into a desired gear ratio.

22 Claims, 3 Drawing Sheets

CONTROL SYSTEM FOR A MULTI-SPEED TRANSMISSION

CROSS-REFERENCE TO RELATED APPLICATIONS

This application claims the benefit of U.S. Provisional Application No. 60/893,882, filed on Mar. 8, 2007. The disclosure of the above application is incorporated herein by reference.

TECHNICAL FIELD

The invention relates to a control system for a multi-speed transmission, and more particularly to a hydraulic control system having a plurality of solenoids and valves operable to actuate a plurality of actuators within the multi-speed transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a transmission.

SUMMARY

The present invention provides a hydraulic control circuit for a transmission. The hydraulic control circuit includes a plurality of solenoids and valves in fluid communication with a plurality of actuators. The actuators are operable to actuate a plurality of torque transmitting devices. Selective activation of the solenoids allows for a pressurized fluid flow to activate at least one of the actuators in order to shift the transmission into a desired gear ratio.

One embodiment of the hydraulic control circuit of the present invention includes a first solenoid that receives a first pressurized fluid flow, a second solenoid that receives a second pressurized fluid flow, a first valve assembly in communication with the first solenoid for selectively receiving the first pressurized fluid flow and in communication with the second solenoid for selectively receiving the second pressurized fluid flow, a second valve assembly in communication with the first valve assembly for selectively receiving one of the first and second pressurized fluid flows, and a third valve assembly in communication with the first valve assembly for selectively receiving one of the first and second pressurized fluid flows. A first actuator is in communication with the second valve assembly for selectively receiving one of the first and second pressurized fluid flows for initiating one of a first pair of a plurality of gear ratios, a second actuator is in communication with the second valve assembly for selectively receiving one of the first and second pressurized fluid flows for initiating one of a second pair of the plurality of gear ratios, a third actuator is in communication with the third valve assembly for selectively receiving one of the first and second pressurized fluid flows for initiating one of a third pair of the plurality of gear ratios, a fourth actuator is in communication with the third valve assembly for selectively receiving one of the first and second pressurized fluid flows for initiating one of a fourth pair of the plurality of gear ratios. The first solenoid is operable to selectively communicate the first pressurized fluid flow to the first valve assembly, the second solenoid is operable to selectively communicate the second pressurized fluid flow to the first valve assembly, the first valve assembly is operable to selectively communicate the first and second pressurized fluid flows to the second and third valve assemblies, the second valve assembly is operable to selectively communicate the first and second pressurized fluid flows to the first and second actuators, and the third valve assembly is operable to selectively communicate the first and second pressurized fluid flows to the third and fourth actuators.

In one aspect of the present invention, the first solenoid includes a first solenoid fluid port in communication with the first valve assembly and the second solenoid includes a second solenoid fluid port in communication with the first valve assembly.

In another aspect of the present invention, the first valve assembly includes a first fluid port in communication with the first solenoid fluid port and a second fluid port in communication with the second solenoid fluid port.

In yet another aspect of the present invention, the first valve assembly includes a third fluid port and a fourth fluid port in selective communication with the first fluid port and a fifth fluid port and a sixth fluid port in selective communication with the second fluid port, wherein the third and fifth fluid ports are in communication with the second valve assembly and the fourth and sixth fluid ports are in communication with the third valve assembly.

In yet another aspect of the present invention, the second valve assembly includes a seventh fluid port in communication with the fourth fluid port and an eighth fluid port in communication with the sixth fluid port.

In yet another aspect of the present invention, the second valve assembly includes a ninth fluid port and a tenth fluid port in selective communication with the seventh fluid port and an eleventh fluid port and a twelfth fluid port in selective communication with the eighth fluid port, wherein the tenth and twelfth fluid ports are in communication with the first actuator and the ninth and eleventh fluid ports are in communication with the second actuator.

In yet another aspect of the present invention, the third valve assembly includes a thirteenth fluid port in communication with the third fluid port and fourteenth fluid port in communication with the fifth fluid port.

In yet another aspect of the present invention, the third valve assembly includes a fifteenth fluid port and a sixteenth fluid port in selective communication with the thirteenth fluid port and a seventeenth fluid port and an eighteenth fluid port in selective communication with the fourteenth fluid port, wherein the fifteenth and seventeenth fluid ports are in communication with the third actuator and the sixteenth and eighteenth fluid ports are in communication with the fourth actuator.

In yet another aspect of the present invention, the first valve assembly includes a moveable first valve operable to allow fluid communication between the first fluid port and the third fluid port when in a first position, to allow fluid communication between the first fluid port and the fourth fluid port when in a second position, to allow fluid communication between the second fluid port and the fifth fluid port when in the first position, and to allow fluid communication between the second fluid port and the sixth fluid port when in the second position.

In yet another aspect of the present invention, the valve is moveable between the first and second positions by a first valve solenoid assembly in fluid communication with the first valve assembly.

In yet another aspect of the present invention, the second valve assembly includes a moveable second valve operable to allow fluid communication between the seventh fluid port and the ninth fluid port when in a first position, to allow fluid communication between the seventh fluid port and the tenth fluid port when in a second position, to allow fluid communication between the eighth fluid port and the eleventh fluid port when in the first position, and to allow fluid communication between the eighth fluid port and the twelfth fluid port when in the second position.

In yet another aspect of the present invention, the second valve is moveable between the first and second positions by a second valve solenoid assembly in fluid communication with the second valve assembly.

In yet another aspect of the present invention, the third valve assembly includes a moveable third valve operable to allow fluid communication between the thirteenth fluid port and the fifteenth fluid port when in a first position, to allow fluid communication between the thirteenth fluid port and the sixteenth fluid port when in a second position, to allow fluid communication between the fourteenth fluid port and the seventeenth fluid port when in the first position, and to allow fluid communication between the fourteenth fluid port and the eighteenth fluid port when in the second position.

In yet another aspect of the present invention, the third valve is moveable between the first and second positions by a third valve solenoid assembly in fluid communication with the third valve assembly.

In yet another aspect of the present invention, the first, second, third, and fourth actuators are three area piston assemblies that each engage a torque transmitting device.

In yet another aspect of the present invention, the first and second pressurized fluid flows contact pistons within the first, second, third, and fourth actuators in order to actuate the torque transmitting devices.

Another embodiment of the hydraulic control circuit of the present invention includes a first solenoid that receives a first pressurized fluid flow, a second solenoid that receives a second pressurized fluid flow, a first valve assembly in communication with the first solenoid for selectively receiving the first pressurized fluid flow and in communication with the second solenoid for selectively receiving the second pressurized fluid flow, a first valve solenoid in communication with the first valve assembly for selectively actuating the first valve assembly, a second valve assembly in communication with the first valve assembly for selectively receiving one of the first and second pressurized fluid flows, a second valve solenoid in communication with the second valve assembly for selectively actuating the second valve assembly, a third valve assembly in communication with the first valve assembly for selectively receiving one of the first and second pressurized fluid flows, and a third valve solenoid in communication with the third valve assembly for selectively actuating the third valve assembly. A first actuator is in communication with the second valve assembly for selectively receiving one of the first and second pressurized fluid flows for initiating one of a first pair of a plurality of gear ratios, a second actuator is in communication with the second valve assembly for selectively receiving one of the first and second pressurized fluid flows for initiating one of a second pair of the plurality of gear ratios, a third actuator is in communication with the third valve assembly for selectively receiving one of the first and second pressurized fluid flows for initiating one of a third pair of the plurality of gear ratios, and a fourth actuator is in communication with the third valve assembly for selectively receiving one of the first and second pressurized fluid flows for initiating one of a fourth pair of the plurality of gear ratios. The first solenoid is operable to selectively communicate the first pressurized fluid flow to the first valve assembly, the second solenoid is operable to selectively communicate the second pressurized fluid flow to the first valve assembly, the first valve assembly is operable to selectively communicate the first and second pressurized fluid flows to the second and third valve assemblies, the second valve assembly is operable to selectively communicate the first and second pressurized fluid flows to the first and second actuators, and the third valve assembly is operable to selectively communicate the first and second pressurized fluid flows to the third and fourth actuators.

In one aspect of the present invention, the first valve assembly includes a moveable first valve operable to allow fluid communication between a plurality of first fluid ports in the first valve assembly, and wherein the first valve is actuatable by a third pressurized fluid flow selectively communicated from the first valve solenoid.

In another aspect of the present invention, the second valve assembly includes a moveable second valve operable to allow fluid communication between a plurality of second fluid ports in the second valve assembly, and wherein the second valve is actuatable by a fourth pressurized fluid flow selectively communicated from the second valve solenoid.

In yet another aspect of the present invention, the third valve assembly includes a moveable third valve operable to allow fluid communication between a plurality of third fluid ports in the third valve assembly, and wherein the third valve is actuatable by a fifth pressurized fluid flow selectively communicated from the third valve solenoid.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
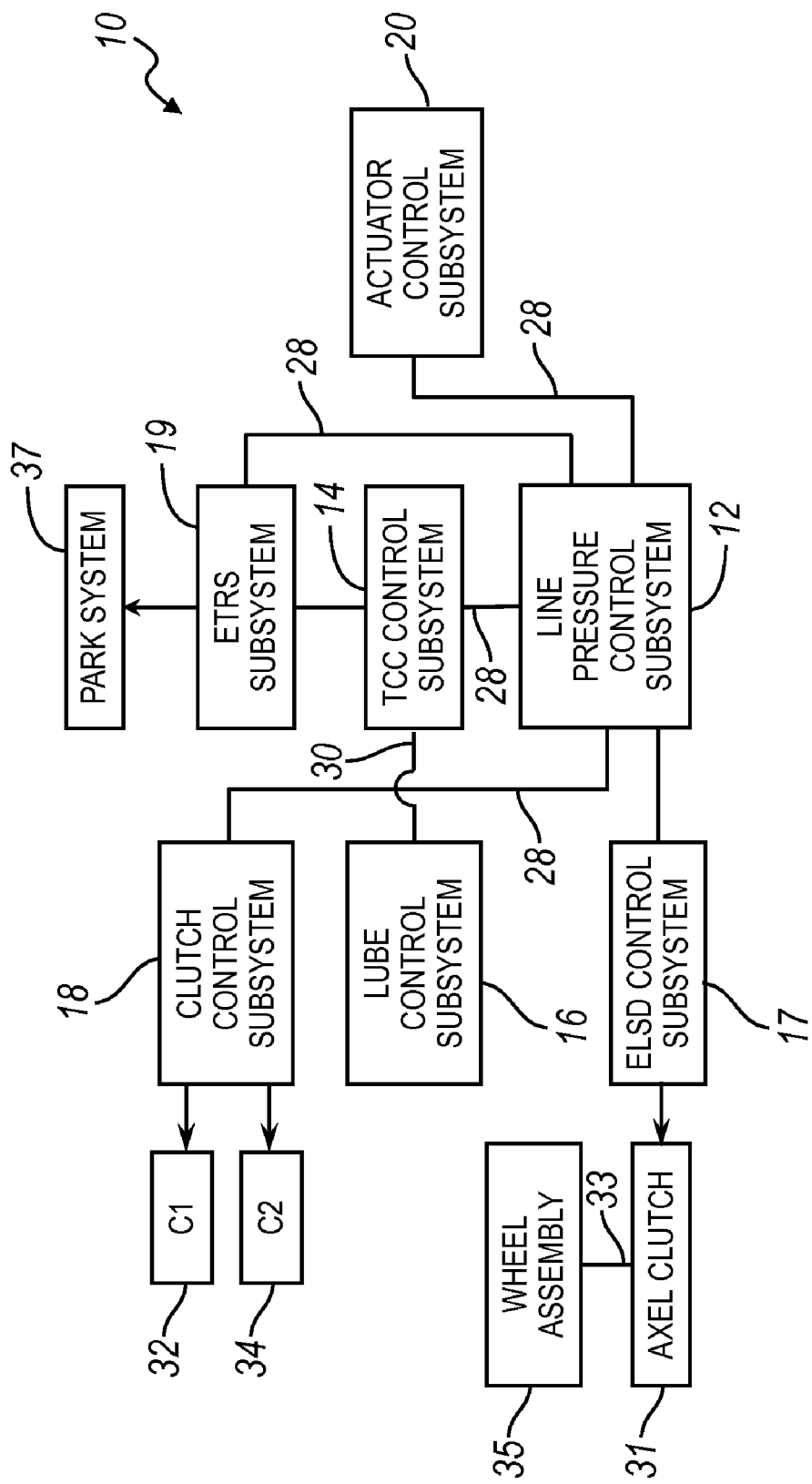
FIG. 1 is a schematic diagram of an embodiment of a hydraulic control system for a dual clutch transmission having an actuator control subsystem according to the principles of the present invention.

With reference to FIG. 1, a hydraulic control system for use in a dual clutch transmission in a motor vehicle is illustrated schematically and generally indicated by reference number 10. The hydraulic control system 10 includes a plurality of subsystems including a line pressure subsystem 12, a torque converter clutch (TCC) control subsystem 14, a lubrication control subsystem 16, an electronic limited slip differential (ELSD) subsystem 17, a clutch control subsystem 18, an electronic transmission range selection (ETRS) subsystem 19, and an actuator control subsystem 20. The hydraulic control system 10 is operable to control the dual clutch transmission, as will be described in greater detail below. Additionally, the hydraulic control system 10 may include various other subsystems without departing from the scope of the present invention.

The line pressure subsystem 12 is operable to provide and regulate pressurized hydraulic fluid, such as oil, throughout the hydraulic control system 10. Accordingly, the line pressure subsystem 12 may include various components (not shown) such as a hydraulic pump, a fluid source, a line pressure blow-off valve, a line pressure regulator valve, and/or a filter. In the example provided, the line pressure subsystem 12 includes a fluid communication channel or line passage, indicated by reference number 28, which directly provides pressurized hydraulic fluid to the TCC control subsystem 14, and the clutch control subsystem 18, and the actuator control subsystem 20. The line passage 28 is illustrated schematically in FIG. 1 as a plurality of separate lines, however it should be appreciated that the line passage 28 may be a single continuous passage or a plurality of linked passages in series or in parallel without departing from the scope of the present invention.

The TCC control subsystem 14 controls the operation of a torque converter (not shown) in the dual clutch transmission. The TCC control subsystem 16 is in direct hydraulic communication with the lubrication control subsystem 16 through a fluid passage 30. The fluid passage 30 may be a single passage or a plurality of linked passages in series or in parallel without departing from the scope of the present invention.

The lubrication control subsystem 16 provides lubrication and cooling to a variety of components throughout the dual clutch transmission. For example, the lubrication control subsystem 16 may direct hydraulic fluid through a plurality of fluid passages (not shown) to components that generate heat.

The electronic limited slip differential (ELSD) subsystem 17 is operable to control an axle clutch 31 located in a differential gear box (not shown) of the motor vehicle. The axle clutch 31 is coupled to a pair of half-axles 33 which in turn are coupled to a pair of wheel assemblies 35. The axle clutch 31 controls the difference in speed between the pairs of half-axles 33 and wheel assemblies 35 in order to eliminate the difference (or "slip") between the pairs of half axles 33 and wheel assemblies 35. An exemplary ELSD control subsystem is disclosed in commonly assigned U.S. patent application Ser. No. 11/950,465 filed on Dec. 5, 2007, and hereby incorporated by reference as if fully disclosed herein.

The clutch control subsystem 18 is operable to control a dual clutch assembly that includes a first clutch 32 and a second clutch 34. The clutches 32, 34 may be used to engage one or more input shafts or countershafts (not shown) within the dual clutch transmission and provide dynamic or "power-on" shifts by alternating engagement between the clutches 32, 34 and the actuator control subsystem 20.

The electronic transmission range selection (ETRS) subsystem 19 receives the shift command from a vehicle operator and in the present embodiment is a shift by wire system. The ETRS subsystem 19 is operable to control a park system 37 upon receipt of electronic control signals. The park system 37 is operable to provide at least two modes of transmission operation including a first mode or out-of-Park mode and a second mode or Park mode. While in Park mode, the park system 37 prevents the transmission from moving the vehicle by preferably locking an output shaft (not shown) of the transmission. While in out-of-Park mode, the park system 37 is disengaged and the transmission may move the vehicle by engaging any of the forward or reverse speed ratios. An exemplary ETRS control subsystem is disclosed in commonly assigned U.S. patent application Ser. No. 11/950,483 filed on Dec. 5, 2007, and hereby incorporated by reference as if fully disclosed herein.

Figure 2:
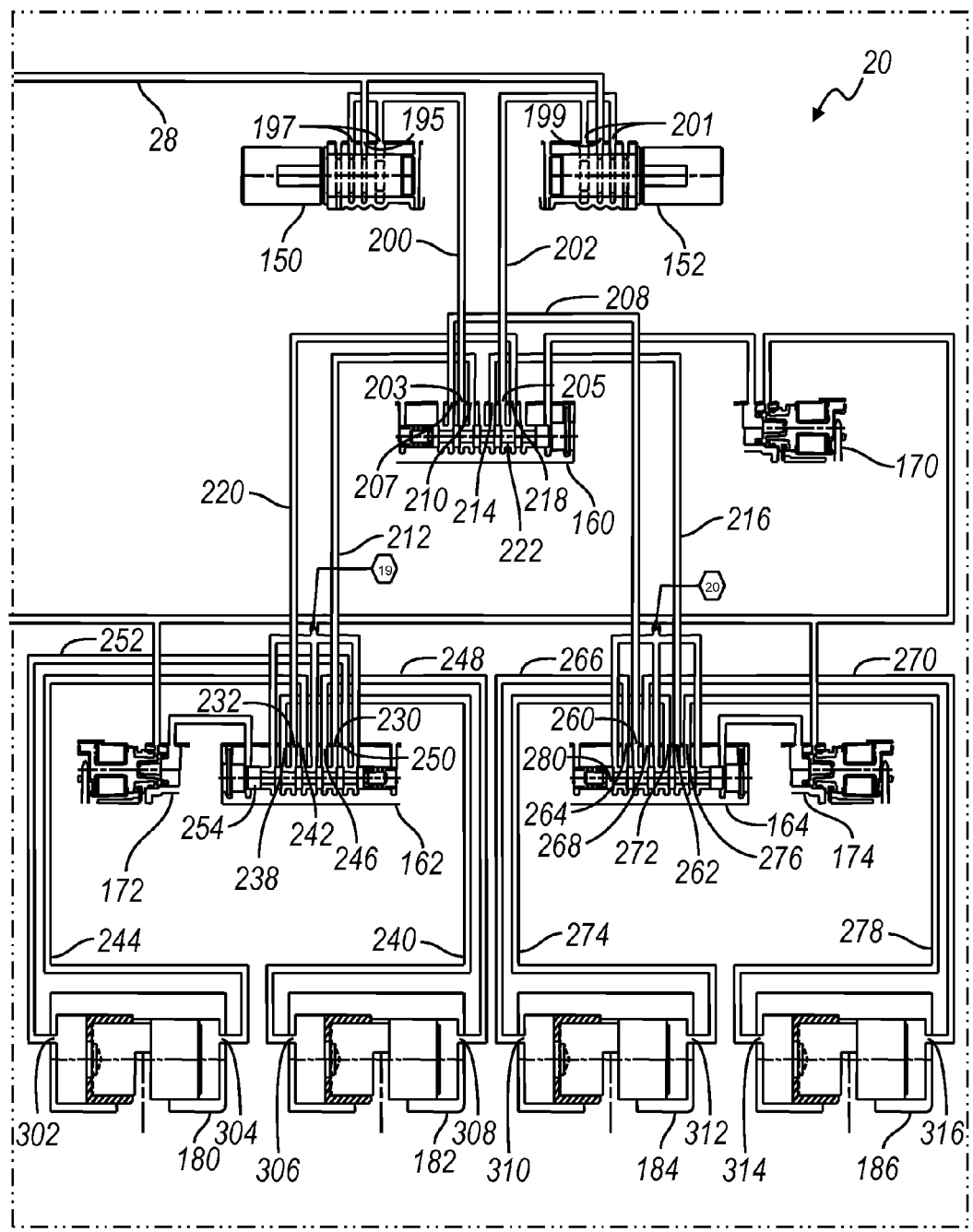
FIG. 2 is a schematic diagram of an embodiment of an actuator control subsystem according to the principles of the present invention.

With reference to FIG. 2, the actuator control subsystem 20 controls the actuation of a plurality of synchronizers, clutches, and/or brakes in order to selectively engage a plurality of gear sets (not shown) within the dual clutch transmission to provide a plurality of forward and reverse speed ratios and a Neutral. The actuator control subsystem 24 includes two variable force solenoids 150, 152, an odd/even actuator security valve 160, an even actuator security valve 162, an odd actuator security valve 164, three on/off solenoid valves 170, 172, and 174 and four "three-area" piston actuators 180, 182, 184 and 186.

Solenoid 150 includes a fluid port 195 that is in communication with the line passage 28 and a fluid port 197 that is in communication with a fluid communication passage 200. Fluid communication passage 200 is in fluid communication with the odd/even actuator security valve 160. Solenoid 150 is operable to communicate the pressurized hydraulic fluid from the line passage 28 to engage the $2^{nd}$, $3^{rd}$, $6^{th}$, and $7^{th}$ gear ratios of the dual clutch transmission, as will be described in greater detail below.

Solenoid 152 includes a fluid port 199 that is in communication with the line passage 28 and a fluid port 201 that is in communication with a fluid communication passage 202. Fluid communication passage 202 is in fluid communication with the odd/even actuator security valve 160. Solenoid 152 is operable to communicate the pressurized hydraulic fluid from the line passage 28 to engage the $1^{st}$, $4^{th}$, $5^{th}$, and Reverse gear ratios of the dual clutch transmission, as will be described in greater detail below.

The odd/even actuator security valve 160 is operable to communicate the pressurized hydraulic fluid communicated from either of the solenoids 150, 152 to one of the odd or even actuator security valves 162, 164. More specifically, the odd/even actuator security valve 160 includes a fluid port 203 in communication with fluid communication passage 200 and a fluid port 205 in communication with fluid communication passage 202 for receiving the pressurized hydraulic fluid from one of the solenoids 150, 152. The odd/even actuator security valve 160 also includes a fluid port 207 in communication with a fluid communication passage 208, a fluid port 210 in communication with a fluid communication passage 212, a fluid port 214 in communication with a fluid communication passage 216, and a fluid port 218 in communication with a fluid communication passage 220. Fluid communication passages 212 and 220 are in communication with the even actuator security valve 162 and fluid communication passages 208 and 216 are in communication with the odd actuator security valve 164. The odd/even actuator security valve 160 includes a valve 222 slidably disposed therein. The valve 222 is moveable between two positions in order to allow selective communication of the pressurized hydraulic fluid from fluid port 203 to fluid port 207 when in a first position and fluid port 210 when in a second position and to allow selective communication of the hydraulic fluid from fluid port 205 to fluid port 214 when in the first position and fluid port 218 when in the second position. The position of the valve 222 is controlled by activation of the solenoid 170.

The even actuator security valve 162 is operable to communicate the pressurized hydraulic fluid from the odd/even actuator security valve 160 to the actuators 180 and 182 in order to engage one of the even gear ratios (i.e., the $2^{nd}$, $4^{th}$, $6^{th}$, and Reverse gear ratios) of the dual clutch transmission. More specifically, the even actuator security valve 162 includes a fluid port 230 in communication with fluid communication passage 212 and a fluid port 232 in communication with fluid communication passage 220 for receiving the pressurized hydraulic fluid from the odd/even actuator security valve 160. The even actuator security valve 162 also includes a fluid port 238 in communication with a fluid communication passage 240, a fluid port 242 in communication with a fluid communication passage 244, a fluid port 246 in communication with a fluid communication passage 248, and a fluid port 250 in communication with a fluid communication passage 252. Fluid communication passages 244 and 252 are in communication with actuator 180 and fluid communication passages 240 and 248 are in communication with actuator 182. The even actuator security valve 162 includes a valve 254 slidably disposed therein. The valve 254 is moveable between two positions in order to allow selective communication of the pressurized hydraulic fluid from fluid port 232 to fluid port 238 when in a first position and fluid port 242 when in a second position and to allow selective communication of the hydraulic fluid from fluid port 230 to fluid port 246 when in the first position and fluid port 250 when in the second position. The position of the valve 252 is controlled by activation of the solenoid 172.

The odd actuator security valve 164 is operable to communicate the pressurized hydraulic fluid from the odd/even actuator security valve 160 to the actuators 184 and 186 in order to engage one of the odd gear ratios (i.e., the $1^{st}$, $3^{rd}$, $5^{th}$, and $7^{th}$ gear ratios) of the dual clutch transmission. More specifically, the odd actuator security valve 164 includes a fluid port 260 in communication with fluid communication passage 208 and a fluid port 262 in communication with fluid communication passage 216 for receiving the pressurized hydraulic fluid from the odd/even actuator security valve 160. The odd actuator security valve 164 also includes a fluid port 264 in communication with a fluid communication passage 266, a fluid port 268 in communication with a fluid communication passage 270, a fluid port 272 in communication with a fluid communication passage 274, and a fluid port 276 in communication with a fluid communication passage 278. Fluid communication passages 266 and 274 are in communication with actuator 184 and fluid communication passages 270 and 278 are in communication with actuator 186. The odd actuator security valve 164 includes a valve 280 slidably disposed therein. The valve 280 is moveable between two positions in order to allow selective communication of the pressurized hydraulic fluid from fluid port 260 to fluid port 264 when in a first position and fluid port 268 when in a second position and to allow selective communication of the hydraulic fluid from fluid port 262 to fluid port 272 when in the first position and fluid port 276 when in the second position. The position of the valve 280 is controlled by activation of the solenoid 174.

Figure 3A:
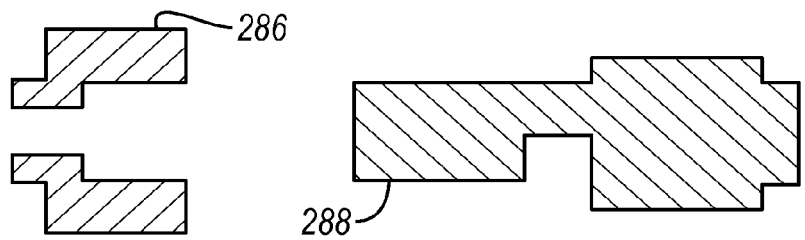
FIG. 3A is a schematic cross-sectional view of a pair of exemplary pistons of a three area piston assembly controlled by the actuator control subsystem of the present invention.
Figure 3B:
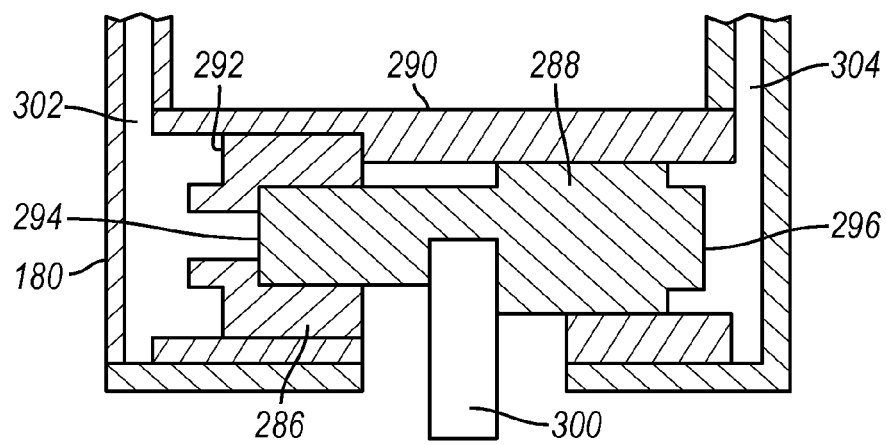
FIG. 3B is a schematic cross-sectional view of an exemplary three area piston assembly in a first position.
Figure 3C:
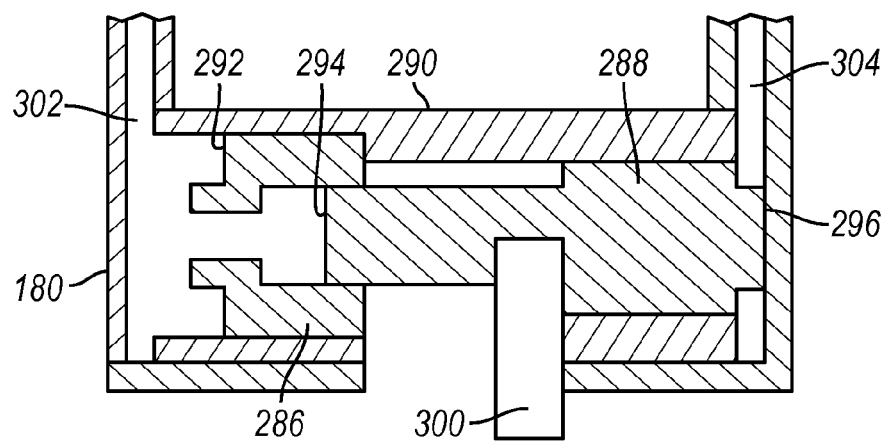
FIG. 3C is a schematic cross-sectional view of an exemplary three area piston assembly in a second position.
Figure 3D:
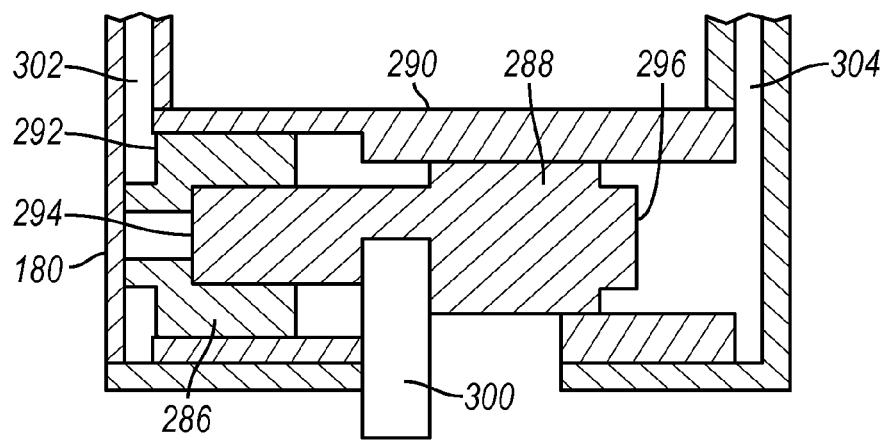
FIG. 3D is a schematic cross-sectional view of an exemplary three area piston assembly in a third position.

Actuators 180, 182, 184, and 186 are preferably three-area piston assemblies operable to each engage a torque transmitting element. With reference to FIG. 3A-D, actuator 180 will be described in greater detail, it being appreciated that actuators 182, 184, and 186 are substantially identical to actuator 180 and accordingly actuators 182, 184, and 186 have corresponding components. Actuator 180 includes a first piston 286 and a second piston 288, best seen in FIG. 3A. The pistons 286, 288 are slidably disposed within a piston housing or cylinder 290, best seen in FIGS. 3B-D. The pistons 286, 288 present three separate areas 292, 294, and 296. Area 292 is located on the first piston 286 and areas 294 and 296 are located on the second piston 288. Each area 292, 296, and 298 have different sizes or surface areas. The pistons 286, 288 engage a finger lever 300 of a synchronizer assembly (not shown). The actuator 180 includes a fluid port 302 that communicates with the areas 292 and 294 of the pistons 286, 288 and a fluid port 304 that communicates with area 296 of piston 288. Fluid port 302 is in communication with fluid communication channel 252 and fluid port 304 is in communication with fluid communication channel 244. Accordingly, the pressurized hydraulic fluid communicated from the even actuator security valve 162 may enter the actuator 180 through one of the fluid ports 302, 304 and contact one of the areas 292, 294, 296 of the pistons 286, 288 in order to move the pistons 286, 288 between various positions. Each position in turn corresponds to a position of the finger lever 300 of the synchronizer assembly. For example, FIG. 3B illustrates the actuator 180 in a neutral position, FIG. 3C illustrates pressurized fluid from the fluid port 302 moving the piston 288 to the right to initiate a $6^{th}$ $4^{th}$ gear ratio, and FIG. 3D illustrates pressurized fluid from the fluid port 304 moving the piston 288 to the left to initiate a $4^{th}$ gear ratio.

Returning to FIG. 2, actuator 182 includes a fluid port 306 in communication with fluid communication channel 240 and a fluid port 308 in communication with fluid communication channel 248. Pressurized hydraulic fluid delivered to actuator 182 from fluid port 306 is operable to engage the Reverse gear ratio and pressurized hydraulic fluid delivered to actuator 182 from fluid port 308 is operable to engage the $2^{nd}$ gear ratio.

Actuator 184 includes a fluid port 310 in communication with fluid communication channel 266 and a fluid port 312 in communication with fluid communication channel 274. Pressurized hydraulic fluid delivered to actuator 184 from fluid port 310 is operable to engage the $7^{th}$ gear ratio and pressurized hydraulic fluid delivered to actuator 184 from fluid port 312 is operable to engage the $5^{th}$ gear ratio.

Actuator 186 includes a fluid port 314 in communication with fluid communication channel 278 and a fluid port 316 in communication with fluid communication channel 270. Pressurized hydraulic fluid delivered to actuator 186 from fluid port 314 is operable to engage the $1^{st}$ gear ratio and pressurized hydraulic fluid delivered to actuator 186 from fluid port 316 is operable to engage the $3^{rd}$ gear ratio. While specific gear ratios for the dual clutch transmission have been associated with specific actuators 180, 182, 184, 186 in the embodiment provided, it should be appreciated that the specific gear ratios initiated by the actuators 180, 182, 184, 186 may vary without departing from the scope of the present invention and is controlled by which specific synchronizers are coupled to the actuators 180, 182, 184, 186.

While the best modes for carrying out the invention have been described in detail, those familiar with the art to which this invention relates will recognize various alternative designs and embodiments for practicing the invention within the scope of the appended claims.

What is claimed is:

1. A hydraulic control circuit for a transmission comprising:
a first solenoid that receives a first pressurized fluid flow;
a second solenoid that receives a second pressurized fluid flow;
a first valve assembly in communication with the first solenoid for selectively receiving the first pressurized fluid flow and in communication with the second solenoid for selectively receiving the second pressurized fluid flow;
a second valve assembly in communication with the first valve assembly for selectively receiving one of the first and second pressurized fluid flows;
a third valve assembly in communication with the first valve assembly for selectively receiving one of the first and second pressurized fluid flows;
a first actuator in communication with the second valve assembly for selectively receiving one of the first and second pressurized fluid flows for initiating one of a first pair of a plurality of gear ratios;
a second actuator in communication with the second valve assembly for selectively receiving one of the first and second pressurized fluid flows for initiating one of a second pair of the plurality of gear ratios;
a third actuator in communication with the third valve assembly for selectively receiving one of the first and second pressurized fluid flows for initiating one of a third pair of the plurality of gear ratios; and
a fourth actuator in communication with the third valve assembly for selectively receiving one of the first and second pressurized fluid flows for initiating one of a fourth pair of the plurality of gear ratios,
wherein the first solenoid is operable to selectively communicate the first pressurized fluid flow to the first valve assembly, the second solenoid is operable to selectively communicate the second pressurized fluid flow to the first valve assembly, the first valve assembly is operable to selectively communicate the first and second pressurized fluid flows to the second and third valve assemblies, the second valve assembly is operable to selectively communicate the first and second pressurized fluid flows to the first and second actuators, and the third valve assembly is operable to selectively communicate the first and second pressurized fluid flows to the third and fourth actuators.

2. The hydraulic control circuit of claim 1 wherein the first solenoid includes a first solenoid fluid port in communication with the first valve assembly and the second solenoid includes a second solenoid fluid port in communication with the first valve assembly.

3. The hydraulic control circuit of claim 2 wherein the first valve assembly includes a first fluid port in communication with the first solenoid fluid port and a second fluid port in communication with the second solenoid fluid port.

4. The hydraulic control circuit of claim 3 wherein the first valve assembly includes a third fluid port and a fourth fluid port in selective communication with the first fluid port and a fifth fluid port and a sixth fluid port in selective communication with the second fluid port, wherein the third and fifth fluid ports are in communication with the second valve assembly and the fourth and sixth fluid ports are in communication with the third valve assembly.

5. The hydraulic control circuit of claim 4 wherein the second valve assembly includes a seventh fluid port in communication with the fourth fluid port and an eighth fluid port in communication with the sixth fluid port.

6. The hydraulic control circuit of claim 5 wherein the second valve assembly includes a ninth fluid port and a tenth fluid port in selective communication with the seventh fluid port and an eleventh fluid port and a twelfth fluid port in selective communication with the eighth fluid port, wherein the tenth and twelfth fluid ports are in communication with the first actuator and the ninth and eleventh fluid ports are in communication with the second actuator.

7. The hydraulic control circuit of claim 6 wherein the third valve assembly includes a thirteenth fluid port in communication with the third fluid port and fourteenth fluid port in communication with the fifth fluid port.

8. The hydraulic control circuit of claim 7 wherein the third valve assembly includes a fifteenth fluid port and a sixteenth fluid port in selective communication with the thirteenth fluid port and a seventeenth fluid port and an eighteenth fluid port in selective communication with the fourteenth fluid port, wherein the fifteenth and seventeenth fluid ports are in communication with the third actuator and the sixteenth and eighteenth fluid ports are in communication with the fourth actuator.

9. The hydraulic control circuit of claim 8 wherein the first valve assembly includes a moveable first valve operable to allow fluid communication between the first fluid port and the third fluid port when in a first position, to allow fluid communication between the first fluid port and the fourth fluid port when in a second position, to allow fluid communication between the second fluid port and the fifth fluid port when in the first position, and to allow fluid communication between the second fluid port and the sixth fluid port when in the second position.

10. The hydraulic control circuit of claim 9 wherein the valve is moveable between the first and second positions by a first valve solenoid assembly in fluid communication with the first valve assembly.

11. The hydraulic control circuit of claim 8 wherein the second valve assembly includes a moveable second valve operable to allow fluid communication between the seventh fluid port and the ninth fluid port when in a first position, to allow fluid communication between the seventh fluid port and the tenth fluid port when in a second position, to allow fluid communication between the eighth fluid port and the eleventh fluid port when in the first position, and to allow fluid communication between the eighth fluid port and the twelfth fluid port when in the second position.

12. The hydraulic control circuit of claim 11 wherein the second valve is moveable between the first and second positions by a second valve solenoid assembly in fluid communication with the second valve assembly.

13. The hydraulic control circuit of claim 8 wherein the third valve assembly includes a moveable third valve operable to allow fluid communication between the thirteenth fluid port and the fifteenth fluid port when in a first position, to allow fluid communication between the thirteenth fluid port and the sixteenth fluid port when in a second position, to allow fluid communication between the fourteenth fluid port and the seventeenth fluid port when in the first position, and to allow fluid communication between the fourteenth fluid port and the eighteenth fluid port when in the second position.

14. The hydraulic control circuit of claim 13 wherein the third valve is moveable between the first and second positions by a third valve solenoid assembly in fluid communication with the third valve assembly.

15. The hydraulic control circuit of claim 1 wherein the first, second, third, and fourth actuators are three area piston assemblies that each engage a torque transmitting device.

16. The hydraulic control circuit of claim 15 wherein the first and second pressurized fluid flows contact pistons within the first, second, third, and fourth actuators in order to actuate the torque transmitting devices.

17. The hydraulic control circuit of claim 1 further comprising a first control subsystem in fluid communication with the first and second pressurized fluid flows, the first control subsystem operable to control a clutch located in a differential gear box coupled to an output of the transmission.

18. The hydraulic control circuit of claim 1 further comprising a second control subsystem in fluid communication with the first and second pressurized fluid flows, the second control subsystem operable to control a park system for initiating a park mode of operation and an out of park mode of operation in the transmission.

19. A hydraulic control circuit for a transmission comprising:
a first solenoid that receives a first pressurized fluid flow;
a second solenoid that receives a second pressurized fluid flow;
a first valve assembly in communication with the first solenoid for selectively receiving the first pressurized fluid flow and in communication with the second solenoid for selectively receiving the second pressurized fluid flow;
a first valve solenoid in communication with the first valve assembly for selectively actuating the first valve assembly;
a second valve assembly in communication with the first valve assembly for selectively receiving one of the first and second pressurized fluid flows;
a second valve solenoid in communication with the second valve assembly for selectively actuating the second valve assembly;
a third valve assembly in communication with the first valve assembly for selectively receiving one of the first and second pressurized fluid flows;
a third valve solenoid in communication with the third valve assembly for selectively actuating the third valve assembly;
a first actuator in communication with the second valve assembly for selectively receiving one of the first and second pressurized fluid flows for initiating one of a first pair of a plurality of gear ratios;
a second actuator in communication with the second valve assembly for selectively receiving one of the first and second pressurized fluid flows for initiating one of a second pair of the plurality of gear ratios;
a third actuator in communication with the third valve assembly for selectively receiving one of the first and second pressurized fluid flows for initiating one of a third pair of the plurality of gear ratios; and
a fourth actuator in communication with the third valve assembly for selectively receiving one of the first and second pressurized fluid flows for initiating one of a fourth pair of the plurality of gear ratios,
wherein the first solenoid is operable to selectively communicate the first pressurized fluid flow to the first valve assembly, the second solenoid is operable to selectively communicate the second pressurized fluid flow to the first valve assembly, the first valve assembly is operable to selectively communicate the first and second pressurized fluid flows to the second and third valve assemblies, the second valve assembly is operable to selectively communicate the first and second pressurized fluid flows to the first and second actuators, and the third valve assembly is operable to selectively communicate the first and second pressurized fluid flows to the third and fourth actuators.

20. The hydraulic control circuit of claim 19 wherein the first valve assembly includes a moveable first valve operable to allow fluid communication between a plurality of first fluid ports in the first valve assembly, and wherein the first valve is actuatable by a third pressurized fluid flow selectively communicated from the first valve solenoid.

21. The hydraulic control circuit of claim 20 wherein the second valve assembly includes a moveable second valve operable to allow fluid communication between a plurality of second fluid ports in the second valve assembly, and wherein the second valve is actuatable by a fourth pressurized fluid flow selectively communicated from the second valve solenoid.

22. The hydraulic control circuit of claim 21 wherein the third valve assembly includes a moveable third valve operable to allow fluid communication between a plurality of third fluid ports in the third valve assembly, and wherein the third valve is actuatable by a fifth pressurized fluid flow selectively communicated from the third valve solenoid.

* * * * *